Patented Sept. 23, 1952

2,611,705

UNITED STATES PATENT OFFICE 2,611,705

PRODUCTION OF POTATO CHIPS

Carl E. Hendel, Berkeley, Calif., assignor to the United States of America as represented by the Secretary of Agriculture No Drawing. Application June 16, 1950,
Serial No. 168,642

6 Claims. (Cl. 99—100)

(Granted under the act of March 3, 1883, as amended April 30, 1928; 370 O. G. 757)

This application is made under the act of March 3, 1883, as amended by the act of April 30, 1928, and the invention herein described, if patented in any country may be manufactured and used by or for the Government of the United States of America for governmental purposes throughout the world without the payment to me of any royalty thereon.

This invention relates to the production of potato chips and the prime object of the invention is the provision of novel methods for producing potato chips of desirable properties from potatoes which would normally give unacceptable products. Further objects and advantages of this invention will be obvious from the description herein.

The preparation of potato chips as generally carried out involves the following steps: Potatoes are peeled, washed, cut into slices, and the slices washed. The slices are then fried in edible oil whereby to cook the potato tissue and to cause puffing of the tissue and to develop crispness and a suitable color, namely, a tan to light brown. In large establishments it is common to employ a continuous fryer which consists essentially of a trough filled with hot oil through which the raw slices are propelled while being fried.

Although the production of potato chips is a relatively simple procedure, one very important problem repeatedly confronts the manufacturer. This problem is caused by the periodic variation in chemical composition of the raw potatoes. The situation can be explained as follows:

If the potatoes are freshly harvested or have been stored at a temperature of about 50° F. or higher, no complications occur. Under such circumstances, the raw slices can readily be fried to produce a crisp product of desirable color. However, when the potatoes have been kept at the lower temperatures (e. g., about 40° F.) necessary for holding the potatoes longer than about 3 months, complications set in. The point is that the potatoes so stored tend to darken on frying to give chips of very undesirable dark brown color. Thus, if the manufacturer merely employs the customary times and temperatures for frying, his product is so dark as to be virtually unsaleable. This problem in most cases cannot be satisfactorily remedied by altering frying time or temperature. For example, if the frying time is reduced, a product of desirable color is produced. However, this product is poor from a standpoint of texture because it is soggy. If the frying temperature is decreased for example to about 250° F., then again a product of desirable color is produced but this product is unsatisfactory because of too high oil content. Whereas the normal oil content of potato chips is about 40%, the chips in such cases will contain 50% or 60% of oil. One known method for remedying this situation involves "conditioning" the potatoes which have been kept in cold storage. This "conditioning" treatment involves holding the potatoes at a temperature of about 70° F. for about 1 to 3 weeks. However, such treatment is often inadequate and is further uneconomical as it involves tying up large quantities of potatoes and impedes the normal sequence of operations.

The reason why stored potatoes tend to darken excessively can be explained as follows: When the potatoes are kept in cold storage, part of the starch in the tubers is converted into glucose or other reducing sugars. Thus it has been shown, for example, that the browning tendency of the tubers increases as the content of reducing sugars increases. It has also been postulated that the reducing sugars react with the nitrogenous constituents in the potatoes whereby to produce dark-colored reaction products. During the frying operation this browning reaction proceeds very rapidly at the high temperature to which the potatoes are subjected. It is to be emphasized however that regardless of the theory involved, it is well established that potatoes which have been kept in cold storage brown excessively on frying as discussed above.

I have now devised a process which avoids the disadvantages pointed out above. In brief, my novel process involves frying the raw potato slices until they have attained a desirable color and then removing the partially-fried slices from the oil and drying them in air at a lower temperature. As a result I am enabled to obtain a finished product of desired crispness, puffiness, color, and oil content even though the raw potato stock would be normally unfit to obtain a satisfactory product. This is possible because browning occurs primarily toward the end of frying, and is very much slower at lower temperature.

My novel procedure is generally carried out in practice as follows:

The potatoes are peeled, washed, and sliced and the slices washed using the customary techniques as well known in the art.

The slices are then fried in oil. As in conventional practice, any edible oil can be used such as cottonseed oil, soy bean oil, corn oil, peanut oil, hydrogenated cotton seed oil, lard, and so forth. The temperature of the oil may be from about 140° C. to about 210° C., preferably from about 150° C. to about 160° C. The time for cooking depends on several factors as for example, the temperature of the oil, the properties of the potato, the thickness of the slice, and so forth. In general, I have found that it is most desirable to fry the slices until they have attained a satisfactory color, that is, a tan to light golden brown shade, that is, a color equivalent to that exhibited by a good quality potato chip, this usually taking a few minutes, say about 2 to about 4 minutes.

After frying the slices to the proper color level, they are removed from the oil, drained, and dried in air. This drying is effected by placing the slices in a current of air, preferably heated air, until they are crisp, that is, until their moisture content is reduced to 5% or less, usually around 3%. Usually, to accelerate the drying, I use a current of air heated to from about 40° C. to about 130° C. In most cases consumers prefer finished chips which are puffed, that is, the surface of the chips is entirely uniformly covered with numerous small bubbles or blisters which render the product opaque. Since in my frying operation puffing may be incomplete, I prefer to carry out the drying operation at an elevated temperature to cause further puffing of the chips. To this end, I prefer to subject the slices to air at a temperature from about 110° C. to about 120° C. An alternative method of carrying out the drying operation is to use a two-stage operation, that is, first subject the partly fried slices to relatively high temperature air (about 110° C. to about 130° C.) until properly puffed and rigid enough that the numerous little blisters do not collapse at lower temperature; and then reduce the temperature of the air, say to 80° C. to 100° C. for completing the drying. In any case the drying can be carried out in apparatus similar to that commonly used in the food processing industry for dehydration of fruits and vegetables such as a belt dehydrator.

The following examples demonstrate in greater detail the operation of my process, these examples being furnished merely by way of illustration. Part D of Example I, part C of Example II, and part D of Example III are not illustrative of my invention but are included as controls to show that the potato stock would normally yield an unacceptable product.

Example I

A. A lot of Kern County, California, White Rose potatoes which had been subjected to cold storage were peeled, sliced to a thickness of 1.6 mm., and the slices washed to remove free starch.

B. One lot of the slices was fried in a batch fryer in cottonseed oil at a temperature of 150° C. for 2.5 minutes. The fried chips were removed and drained. It was observed that the fried chips had a light golden brown color but were flaccid in texture.

C. The chips from step B were then placed in a drier where they were subjected to a current of air at 80° C. for 30 minutes. The products were removed from the drier and noted to have a crisp texture and a desirable light golden brown color. Further, the products were adequately puffed. There were but a few small unpuffed areas and these were small and did not adversely affect the appearance.

D. (Control experiment.) A lot of the raw slices was fried in the batch fryer in cottonseed oil at a temperature of 150° C. for 3 minutes. The fried chips had a crisp texture but were undesirably dark brown in color.

Example II

A. Raw potato slices as prepared in Example I, part A, were fried in a batch fryer in cottonseed oil at a temperature of 160° C. for 2 minutes. The fried chips were then removed from the oil and drained. It was noted that the fried chips had a desirable light golden brown color and were fairly rigid but contained flabby, translucent areas.

B. The chips from step A were placed in an air suspension dryer where they were subjected to a high velocity blast of air at 120° C. for 8 minutes. The products were removed from the dryer and noted to have a crisp texture and a desirable light golden brown color. Further, the products were properly puffed, the surfaces of the chips being thoroughly and uniformly puffed.

C. (Control experiment.) A lot of the raw slices was fried in the batch fryer at a temperature of 160° C. for 2.5 minutes.

The fried chips had a crisp texture but had an undesirable dark brown color.

Example III

A. A lot of Idaho russet potatoes which had been stored 6 months at 40° F. were peeled, sliced to a thickness of 1.6 mm., and the slices washed to remove free starch.

B. One lot of the slices was fried in a batch fryer in cottonseed oil at a temperature of 160° C. for 1.75 minutes. The fried slices were removed and drained. It was observed that the slices were of a light brown color.

C. The fried slices from step B were divided into 3 separate samples and each dried in air under different conditions until they became crisp. These products all had a desirable light brown color and were adequately puffed. The drying conditions used and the oil contents of the products are set forth in the following table:

| Sample | Drying conditions | | Oil content of product, percent |
|---|---|---|---|
| | Temp., ° C. | Time, min. | |
| 1 | 115 | 8 | 42.0 |
| 2 | 80 | 30 | 42.8 |
| 3 | 105 | 10 | 43.1 |

D. (Control experiment.) One lot of the raw slices as prepared in part A was fried in the batch fryer in cottonseed oil at 160° C. until crisp (2.25 minutes.) The chips had a crisp texture but were undesirably dark brown in color.

Having thus described my invention, I claim:

1. A process of producing fried potato chips of desirable properties from potatoes which have been kept in cold storage and therefore have excessive browning tendencies and would normally produce fried chips of an excessively dark color comprising frying the raw potato slices in oil only until they develop a color equivalent to that exhibited by a good quality potato chip but not long enough to make them crisp, then removing the slices from the oil and subjecting them to drying in air until they become crisp.

2. A process of producing fried potato chips of desirable properties from potatoes which have been kept in cold storage and therefore have excessive browning tendencies and would normally produce fried chips of an excessively dark color comprising frying the raw potato slices in oil only until they develop a color equivalent to that exhibited by a good quality potato chip but not long enough to make them crisp, then removing the slices from the oil and subjecting them to drying in air at a temperature up to about 130° C. until they become crisp.

3. A process of producing fried potato chips of desirable properties from potatoes which have been kept in cold storage and therefore have excessive browning tendencies and would normally produce fried chips of an excessively dark color comprising frying the raw potatoe slices in oil at a temperature of 140° C. to about 210° C. until they develop a desirable tan to light golden brown color but not long enough to make them crisp, then removing the slices from the oil and subjecting them to drying in air until they become crisp.

4. The process in accordance with claim 3 wherein the drying is conducted at a temperature from about 40° C. to about 130° C.

5. The process in accordance with claim 3 wherein the drying is conducted at a temperature from about 110° C. to about 130° C.

6. The process in accordance with claim 3 wherein the drying is accomplished in two stages, the first stage being at a temperature from about 110° C. to about 130° C., the second stage at a temperature from about 80° C. to about 100° C.

CARL E. HENDEL.

REFERENCES CITED

The following references are of record in the file of this patent:

UNITED STATES PATENTS

| Number | Name | Date |
|---|---|---|
| 1,676,160 | Ruffner | July 3, 1928 |
| 2,101,506 | Morrow et al. | Dec. 7, 1937 |
| 2,401,392 | Ware et al. | June 4, 1946 |